M. B. LLOYD.
TUBE WELDING MACHINE.
APPLICATION FILED APR. 6, 1912.
1,124,756.
Patented Jan. 12, 1915.
5 SHEETS—SHEET 4.
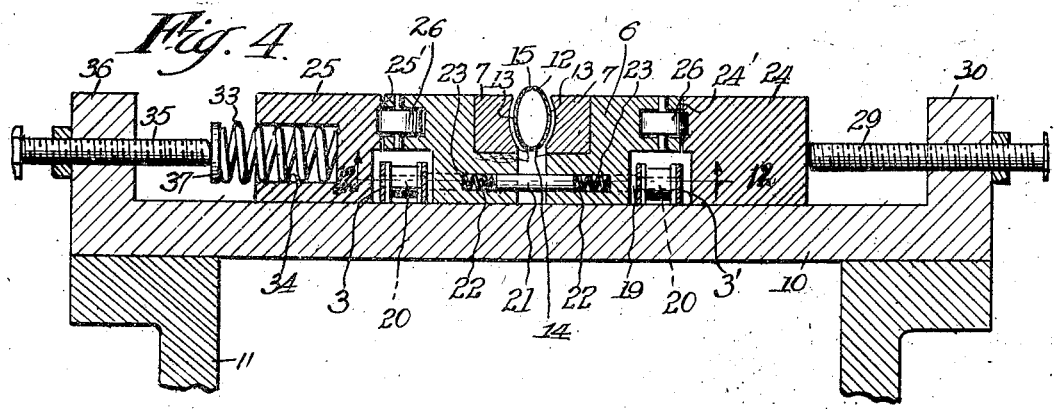
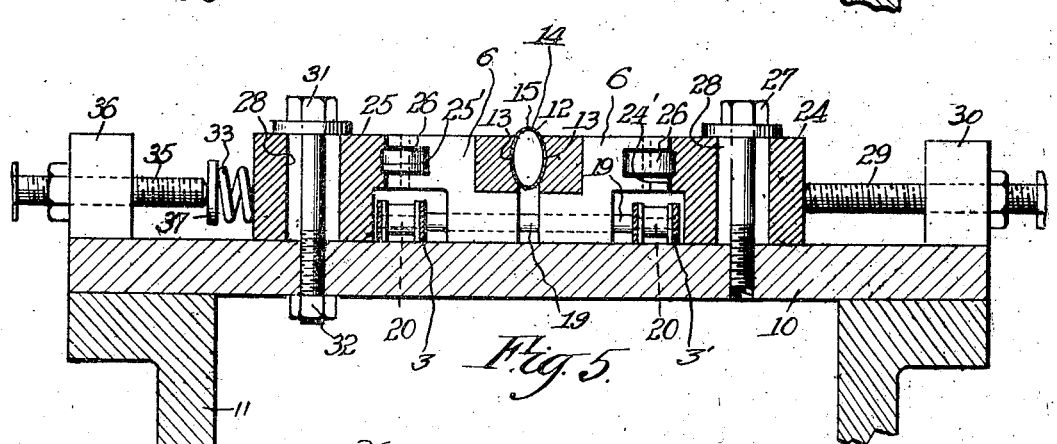
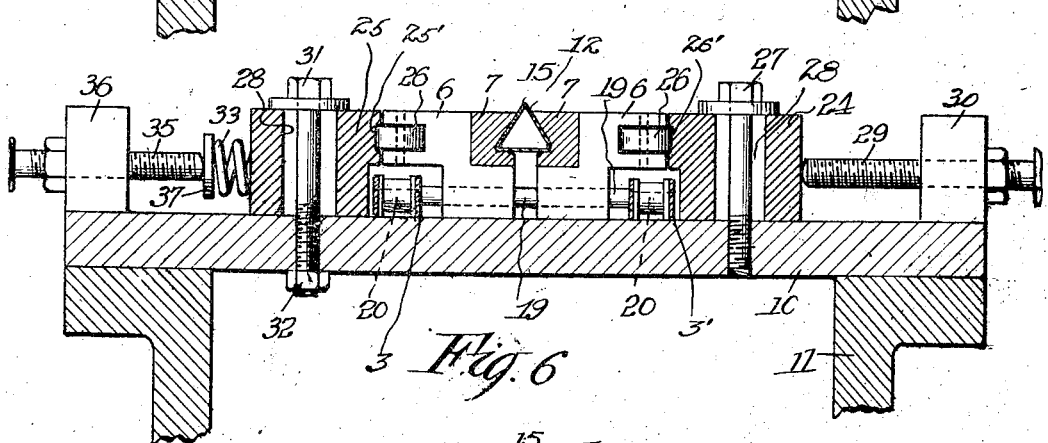
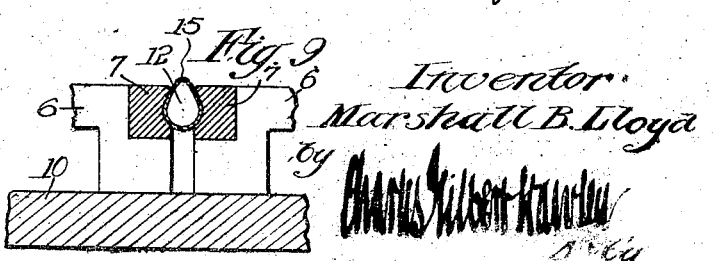
Witnesses:
Arthur D. Nelson
Edward F. Wilson
Inventor:
Marshall B. Lloyd
by Charles Gilbert Hawley
Atty

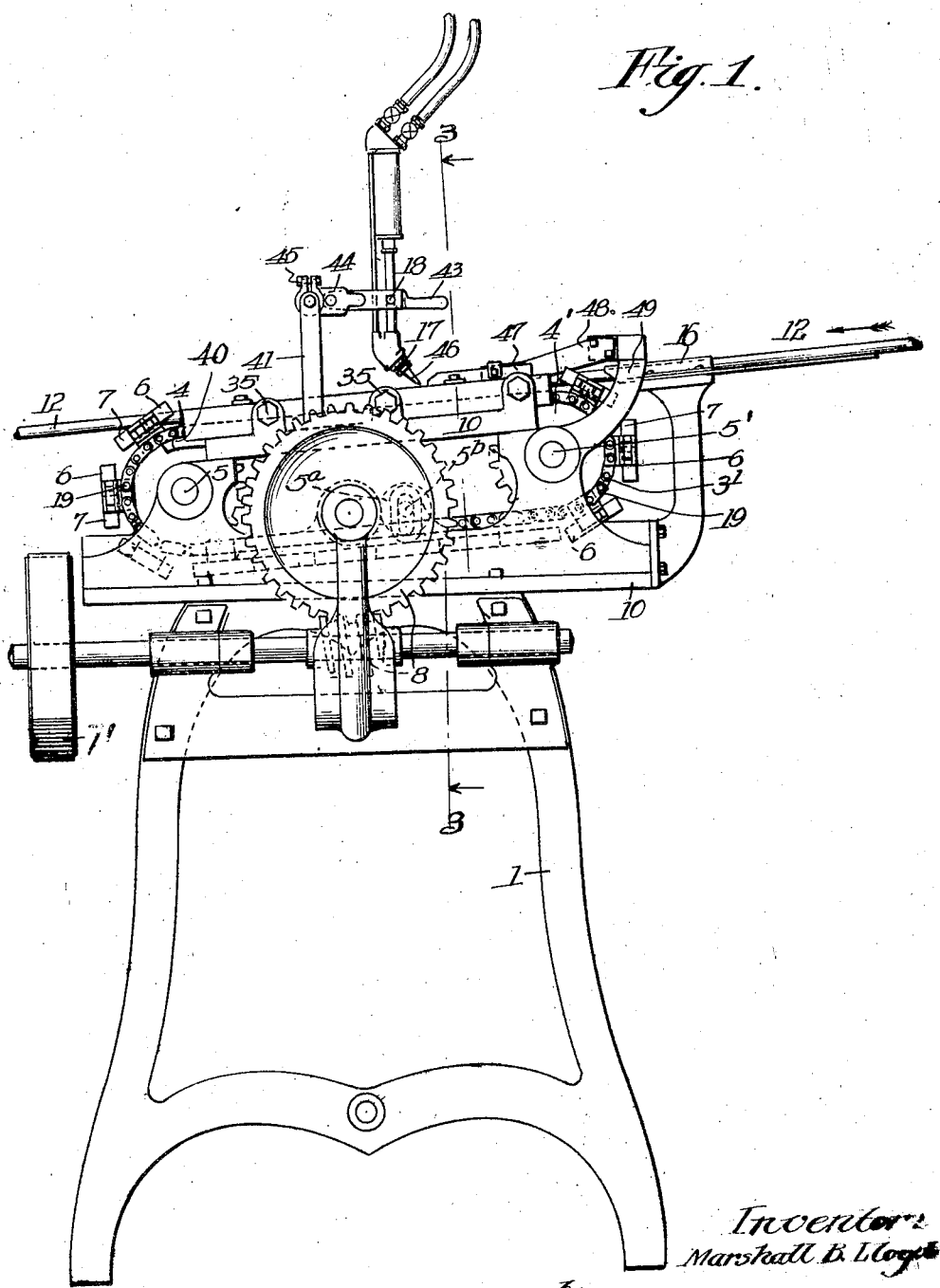

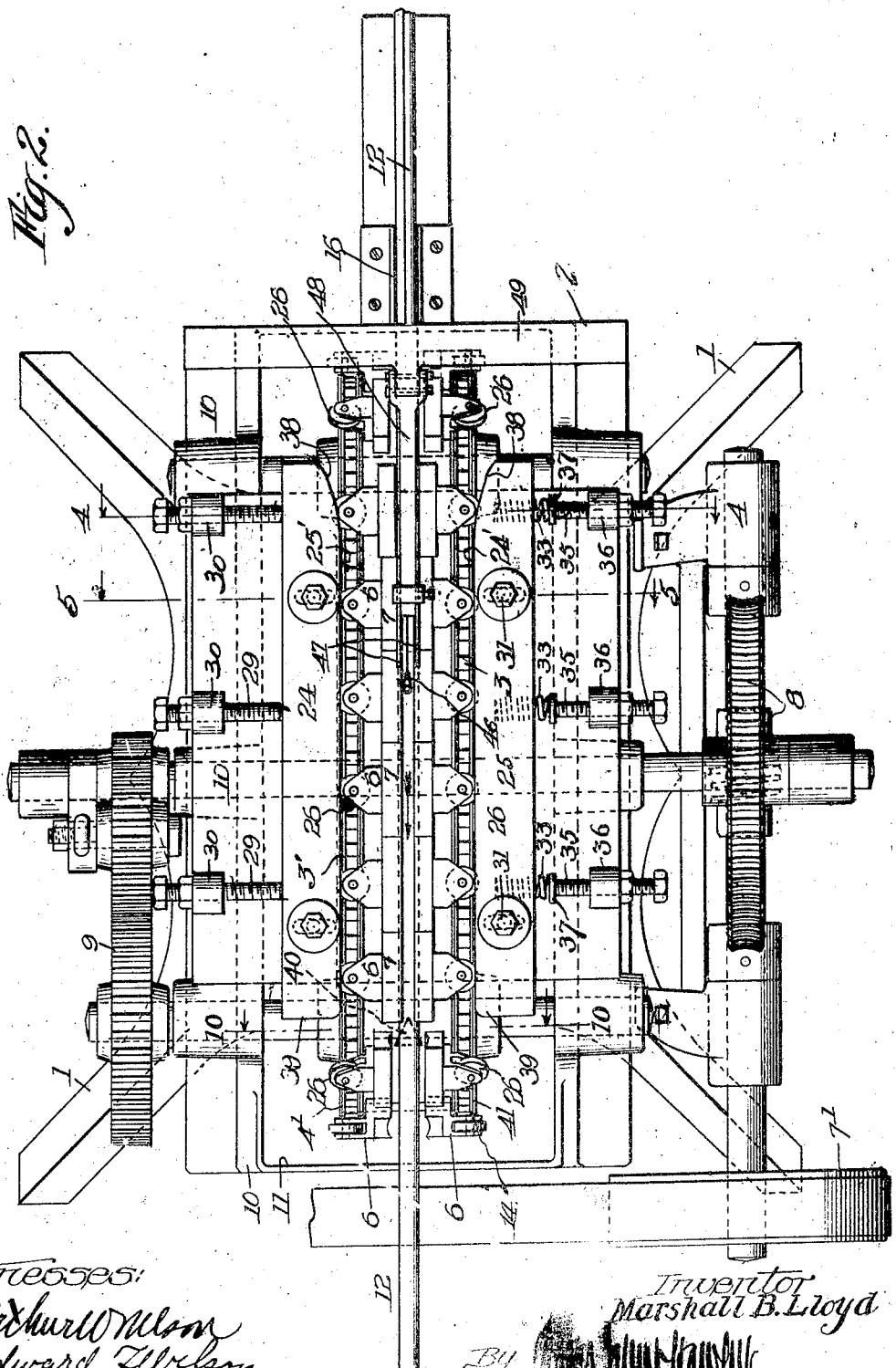

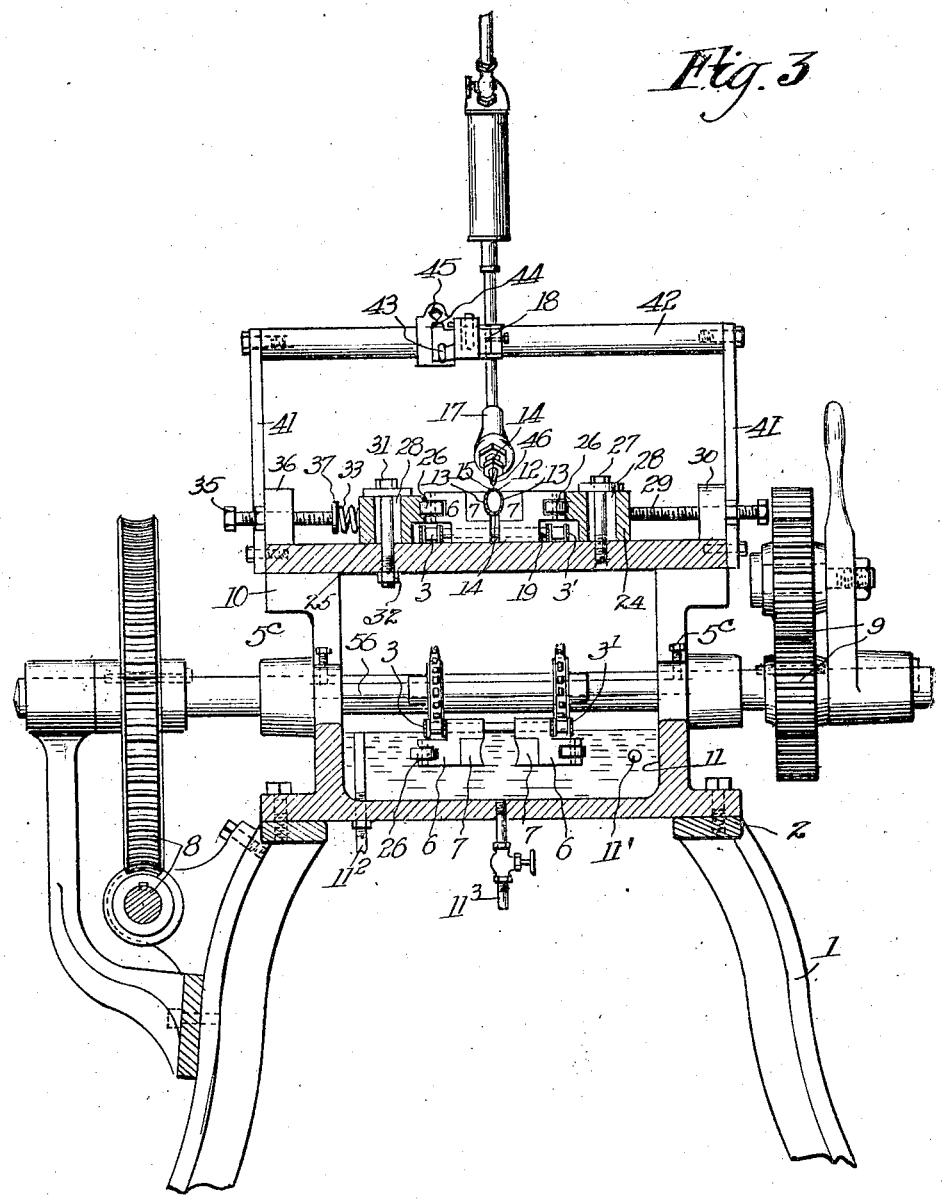

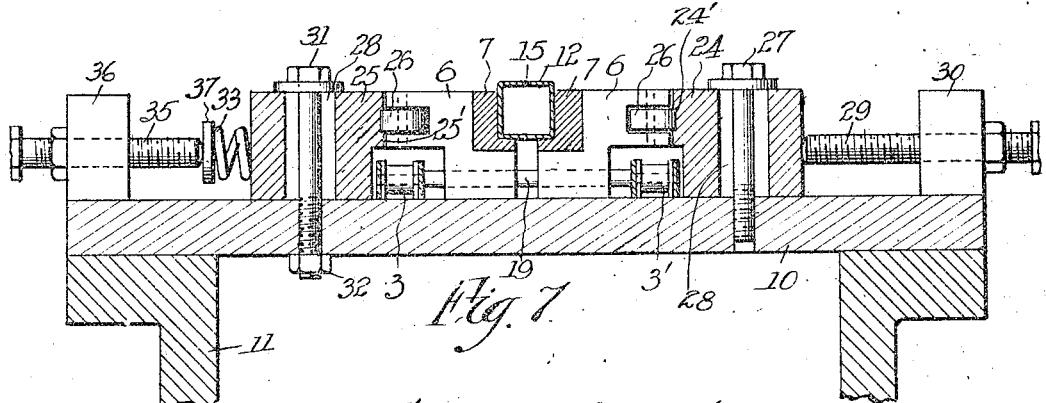
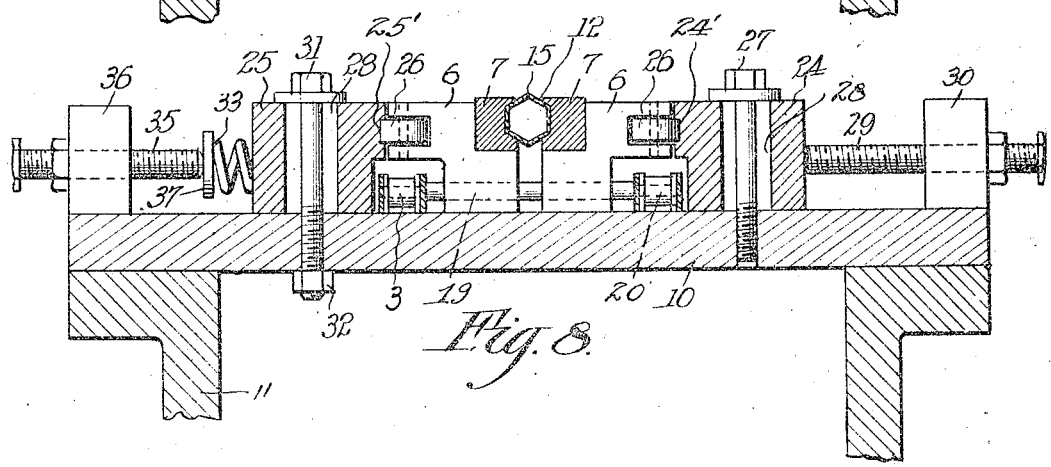
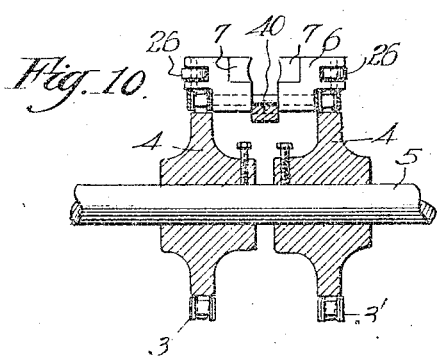
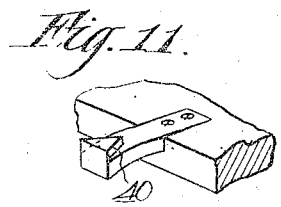
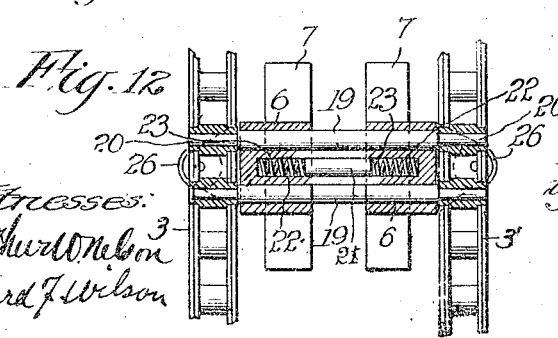

UNITED STATES PATENT OFFICE.

MARSHALL BURNS LLOYD, OF MENOMINEE, MICHIGAN, ASSIGNOR, BY MESNE ASSIGNMENTS, TO THE ELYRIA IRON & STEEL COMPANY, OF ELYRIA, OHIO, A CORPORATION OF OHIO.

TUBE-WELDING MACHINE.

1,124,756.   Specification of Letters Patent.   Patented Jan. 12, 1915.

Application filed April 6, 1912. Serial No. 689,094.

*To all whom it may concern:*

Be it known that I, MARSHALL BURNS LLOYD, a citizen of the United States, and a resident of Menominee, county of Menominee, and State of Michigan, have invented certain new and useful Improvements in Tube-Welding Machines, of which the following is a full, true, clear, and exact description, such as will enable others skilled in the art to make and use the same.

The object of my invention is to provide a machine by means of which metal tubing formed from sheet or strip metal may be rapidly, economically and uniformly welded in any desired length, size and shape.

Another object of my invention is to provide a machine by means of which the seam of pre-formed metal tubes particularly of non-circular cross-section, may be continuously and automatically welded, and my invention has for a further object the provision of a tube welder by means of which the non-circularity of the tubing may be utilized to automatically control the relation of the tube seam and welding means while the tube is moving forward, as an aid to the proper and accurate welding of said seam.

This present invention is related to that which is disclosed in my pending application, Serial Number 638,203 filed July 12, 1911, and may be used in the process disclosed in my application Serial Number 638,202, also filed July 12, 1911.

My invention resides in a machine whereby the tube is moved or propelled longitudinally forward at a constant speed, and by which, as the tube travels, the seam is progressively welded by means of a heater or burner that is relatively stationary. By means of this mechanism sufficient pressure is exerted at the seam to hold or maintain the tube edges in fixed or abutted relation and insure the welding of said edges.

My invention more especially concerns the welding of the seams of tubes that are not circular in cross-section at the time they are welded, and which may or may not, as desired, be given a circular cross-section after being welded; in other words, the tubes may be initially non-circular in cross section and may be left in that form after completion, or they may be of initially non-circular cross section for the mere purpose, as herein recited, of directly or indirectly controlling the relation of the seam to the welding mechanism.

My invention also resides in novel features of construction and in combinations of parts making up a complete welding machine; all as hereinafter fully described and particularly pointed out in the appended claims.

My invention will be more readily understood by reference to the accompanying drawings wherein I have illustrated a tube welding machine made in accordance with and embodying my invention, and wherein:

Figure 1 is a side elevation of said machine; Fig. 2 is an enlarged top plan view, the burner being removed to more clearly show other parts of the machine; Fig. 3 is an enlarged vertical transverse sectional view on the line 3—3 of Fig. 1; Figs. 4 to 9 inclusive are enlarged transverse sections of the vise mechanism illustrating various adaptations of the machine to the welding of tubes of different cross-sectional forms, the forms shown in Figs. 4, 5 and 9 being preferred in cases where the tube is initially given a non-circular cross-section and after being welded is made circular in form; Fig. 10 is a detail transverse sectional view on the line 10—10 of Fig. 2 showing the operation of the vise opening device; Fig. 11 is a perspective view of said device; and Fig. 12 is a horizontal transverse section on line 12—12 of Fig. 4, showing details of the conveyer chains and vise sections.

In order to carry out my invention I construct a machine which has a continuously operating mechanism adapted to receive and propel the tube longitudinally forward at a substantially constant speed, to coöperate with the non-circular tube for positioning it accurately with respect to a heating device, and preferably to maintain or cause the maintenance of sufficient pressure at the tube seam to hold the tube edges in fixed relation and aid in the formation of the weld. I prefer to construct a machine which has a relatively stationary welding burner adapted to play a flame upon the seam of the tube as it travels, and which has an automatic traveling vise arranged in sections adapted to successively clamp the tube and convey it forward, exert pressure at the seam thereof, and torsionally twist or rotate the incoming tube to accurately position or aline its seam with the burner.

As shown in the drawings a frame 2 is provided whereon the operating mechanisms are mounted at a convenient height for use. This mechanism includes the continuously moving vise. A pair of continuous conveyer chains 3, 3', are mounted upon sprocket wheels, 4, 4', which in turn are carried by transverse shafts, 5, 5'. These chains are arranged to travel in unison at a constant speed and are provided with a number of pairs of opposed vise blocks or sections 6. The series of opposed vise blocks constitute what can properly be termed a continuous vise, the blocks being of such length that end-to-end along the upper horizontal portion of the chains they present a long continuous gripping or active portion. Power is applied to move the vise in the direction of the arrow in Figs. 1 and 2 by means of the belt pulley 7', the worm gearing 8 and the train of gears 9. The machine is provided with a bed plate 10 upon which the upper horizontal or active portions of the conveyer chains run and upon which are secured the devices for causing pressure at the tube seam. Beneath the table and the transverse shafts 5, 5' I arrange a tank 11 to contain water or other cooling liquid into which the vise blocks pass as they return from the rear to the forward end of the machine. The water enters through the inlet pipe 11', at one side of the tank and leaves through the overflow pipe 11² at the other side.

11³ represents a valved drain pipe for emptying the tank.

As clearly shown in Figs. 4 and 5, the jaws 7 of the vise blocks are shaped to conform to the outer contour or shape of the particular non-circular tube to be welded. The tube receiving opening between each two jaws is repeated in every other pair of jaws and it is obvious that the extended opening thus formed between the jaws comprising the straight or active portion of the moving vise is a straight opening of non-circular cross-section. As the tube which these jaws are made to fit is not circular and as a considerable length of the tube is held in the straight portion of the vise, the tube will be automatically straightened thereby and its seam will be presented in a straight line parallel to the edges of the jaws notwithstanding any initial twist or distortion of the tube. In other words, when the end of the non-circular tube passes into the vise that end will be adjusted to the jaws. This action will be repeated in successive portions of the tubing as they are grasped by successive pairs of vise jaws, the vise itself serving to correct the initial irregularities in the seam of the tube. In Figs. 4 and 5 I have illustrated the tube 12 as being oval in shape or as having flattened side portions 13 and more sharply curved upper and lower portions 14. It will be at once understood, however, that if the tube is of some other cross-sectional shape than the one therein illustrated, the contacting faces of the jaws 7 will be constructed accordingly as in Figs. 6, 7, 8 and 9, wherein I have shown tubes of various cross sectional shapes. As hereinbefore mentioned this type of machine is designed to weld the seams of tubes formed from a long strip of sheet metal. In the forming process the edges of the strip are brought preferably into butt relation in readiness for welding.

The oval tube illustrated in Figs. 3, 4 and 5 is formed with the longitudinal seam or joint 15 in the middle of one of the more sharply curved portions 14 and when the tube is presented to the welding flame by the vise this side or portion of the tube is turned uppermost. The machine is provided on its forward end with a stationary guide 16 through which the tube passes to the vise jaws. When the end of the tube is grasped or clamped by one pair of vise jaws, they carry the tube forward. The succeeding pair of jaws immediately rise into position, grasp the portion of the tube immediately following that portion which has been clamped and so on throughout the tubing, this operation being continuous. Due to various causes, the forming of the strip of metal leaves the tube irregular or wavy and more or less spirally twisted, hence the seam is not in a straight line. Since there is a relative movement between the welding burner and the tube, it follows that an alined relation must exist at all times during the welding operation so that the weld will always occur exactly at the seam. I correct the irregularities of the seam by arranging the vise to rotate or torsionally twist the tube as hereinbefore explained and thereby conform the seam to the position of the burner. This arrangement offers the additional advantage that the vise acts to straighten the tube and prevent it from warping or becoming distorted due to the heat from the burner. I form the jaws so that they grasp the tubing in such a manner as to both straighten and twist the tube, as may be necessary, thereby automatically positioning the seam of the tube accurately in alinement with the welding flame. It will be at once apparent that the pressure to twist the tube can best be applied adjacent to its upper and lower parts and I therefore form the clamping surfaces of the jaws to grip the tube at least at these points although it is better that they almost surround the tube, leaving a sufficient portion of the metal adjacent the seam exposed for the weld. In this manner there will be no tendency of the vise to crush or distort the walls of the tube as the jaws are forced into clamping contact upon it. If the cross section of the tube has a major axis, as for instance, the oval tubes of Figs. 4, 5 and 9, excellent results are obtained by arranging the longitudinal seam at one end of this axis so that the tubing may be positioned with its major axis vertical and the seam uppermost. With this arrangement the maximum twisting and straightening effort can be exerted upon the tube. Obviously, however, the seam may be formed at any portion of the tube and the machine constructed to adapt it thereto. The oval form is well adapted to the manufacture of extremely accurate circular tubing for the reason that the strip metal can be initially formed into an oval tube in which condition the seam may be accurately welded as herein described. The tube may then be subjected to the pressure of ordinary circular dies (not shown) and thereby given a perfect circular form.

Having now explained the purpose and nature of my invention, together with the essential elements of the machine for carrying out these functions, I will describe in detail the various parts of the said machine.

The vise blocks 6 are carried by pins or rods 19 which extend across from chain to chain and which are reduced at their ends 20 to form chain rivets. Each pair of opposed blocks is carried upon two of the pins 19 and is freely movable laterally thereon so that they can be moved toward each other to clamp the tube and from each other to free the tube. Each pair of vise blocks is normally held open or separated by means of a transverse dowel pin 21 which is mounted in holes or pockets 22 in the lower parts of the blocks (Figs. 4 and 12). The combined depth of the two corresponding holes 22 is considerably more than the length of the pin 21, this difference allowing room for compression springs 23 in the holes at the ends of the pin 21. The springs resiliently hold the vise blocks 6 at the outward limit of their movement so that as the vise moves the blocks will pass freely into alinement with the tube 12 (Fig. 2). I provide pressure mechanism for the purpose of causing these blocks to close successively and clamp the tube and at the same time correct any irregularities in the tube as previously explained. This pressure mechanism consists of cam bars or guides 24 and 25 adjustably mounted upon the face of the bed plate or platen 10, and for the purpose of reducing the friction and consequently the power necessary to draw the chains with their vise blocks through between the guides, I arrange a series of anti-friction rollers 26 in the outer ends of the blocks arranged to bear upon the inner cam faces 24' and 25' of the guides respectively. I make these guides adjustable from and toward the tube for the purpose of widening the range of the machine and adapting it to tubes of different sizes and shapes. The guide 24 is held upon the platen by means of the bolts 27, which screw into the bed plate 10, the guide being provided with slotted holes 28 to receive the bolts and allow for adjustment. This guide is held against lateral pressure by means of the horizontal set screws 29 which are mounted in lugs 30 forming part of the bed plate 10. The opposite guide 25 is held in a similar manner except that it is not tightly clamped to the bed plate but is held down by the bolts 31 which are threaded into the bed plate and held rigid by the jam nuts 32. This guide 25 is movable from and toward the guide 24, and I force it toward the guide 24 by means of compression springs 33 which are mounted in pockets 34 formed in the outer edge of the guide and which are interposed between set screws 35 mounted in lugs 36 similar to the lugs 30, suitable washers 37 being provided upon which the points of the set screws bear. This manner of mounting the guides provides an adjustable compressive force upon the tube at all times and permits the machine to operate upon the tube without undue friction and with due regulation with respect to the expansion of the tube when heated.

It will now be clear that when the tube is engaged by the vise jaws and carried beneath the flame played upon the seam by the welding torch 17, the pressure of the vise jaws against the tube will hold the tube edges in butt relation and cause sufficient pressure to complete the weld. As the tube advances through the machine the weld will become cool enough so that the longitudinal seam will not open again when the tube is released from the vise jaws. The cam or inner surfaces 24' and 25' of the cam guides 24 and 25, as seen in Fig. 2, are substantially straight and parallel throughout the greater part of their length. Their forward ends 38, however, are flared outwardly for the purpose of permitting the vise blocks with their anti-friction rollers, which when free from the guides are normally held separated, to freely enter between the guides. This spreading and contracting of the pairs of vise jaws permits the jaws to move upwardly past the sides of the tube and close properly upon the tube. The guides 24 and 25 terminate at their rear ends 39 just before the chains commence to travel downwardly around the sprocket wheels 4', consequently the vise jaws are at this point free to be separated by the compression springs 23 and to be moved outwardly to disengage the tube. In order to force the vise jaws to open if they should not do so freely under the force of the compression springs 23, I provide a wedge cam 40 which is mounted on the rear end of the bed plate 10 centrally below the tube, and in position to enter between the lower opposed faces of the vise blocks and positively force or spread them apart. It will now be clear that the vise blocks with their jaws successively close upon the tube at the forward end of the machine, that they exert a compression force upon the tube, carrying the tube with them with its seam positioned beneath the flame, and that at the rear end of the machine they successively open and release the tube. It is quite apparent that various welding means may be used for heating the tube instead of the torch 17, but I prefer for a number of reasons to use a gas welding flame arranged to play upon the seam of the tube as it travels beneath said flame. The torch 17 admirably suits the purpose. The torch shown is of well known form using a mixture of oxygen and acetylene gases which burn with an extremely hot flame at the nozzle 46. This flame may be described as consisting of a fine, narrow welding flame of extreme heat impinging directly upon the seam of the tube, and a forwardly extending corona of lesser heat and larger than the welding flame. The corona serves to preheat the tube in advance of the welding flame, raising the temperature of the tube to nearly the welding temperature and thus enabling the welding portion of the flame to complete the weld quickly. Thus the tube seam is welded as fast as the tube travels. The speed at which the weld is performed is governed to a great extent by the temperature of the flame and its distance from the tube. This makes it desirable to have considerable regulation for the torch so that the maximum rate of welding may be obtained, and for the purposes of examination and repair. I therefore provide an adjustable holder 18 by which it is possible to attain every needful adjustment. This holder is supported in a frame positioned over the vise about the middle thereof. This frame comprises a pair of standards 41 rising from the opposite sides of the bed plate 10 and carrying in their upper ends a transverse rod or shaft 42. The torch is carried in the outer end of a lever 43 which is pivotally mounted to swing from and toward the tube upon a bracket 44, which in turn is clamped upon the shaft 42 by means of the clamping bolt 45. The nozzle 46 of the torch is at the lower end thereof and is pointed diagonally downward toward the tube at an angle of about 45 degrees so as to project its flame forwardly. The torch is rotatively mounted in the lever 43 whereby the nozzle can be swung laterally and the flame accurately impinged directly upon the seam of the tube. By reason of the lever 43 being pivotally mounted upon the bracket 44, the torch as a whole can be swung upwardly carrying the flame away from the tube for the purpose of examination and repair. In order to conserve the heat of the flame and confine the metal adjacent to the seam so that the remaining portions of the tube will not be unnecessarily heated, I provide suitable guards or heat insulators 47 arranged longitudinally of the tube and on each side of the flame. I mount these guards or heat insulators in the free end of the bracket 48 which is secured to and carried by a transverse bracket 49 forming a part of the frame of the machine. This bracket 48 is bolted to the bracket 49 so that it can be readily removed to facilitate repairs.

As many modifications of my invention will readily suggest themselves to one skilled in the art, I do not limit or confine my invention to the specific structures or combinations of parts herein shown and described, except as required by express limitations in the claims hereunto appended.

It should be noted that portions of the subject matter of this specification are not specifically claimed in this case, but are both described and claimed in applications filed by me which have matured into Patent No. 1,027,864 issued May 28, 1912, and entitled Continuous processes of manufacturing metal tubing, and No. 1,027,865 issued May 28, 1912, entitled Continuous tube mill; and also in my pending applications Serial No. 689,093 and Serial No. 689,095, both filed April 6, 1912.

Having thus described my invention, I claim as new and desire to secure by Letters Patent:

1. A tube welding machine comprising a welding burner arranged to play a welding flame upon the seam of the tube, in combination with mechanism automatically operating to propel the tube longitudinally forward at a constant speed and manipulate said tube to progressively present the seam thereof in predetermined relation to said welding flame.

2. A tube welding machine comprising a welding burner arranged to play a welding flame upon the seam of the tube, in combination with mechanism automatically operating to propel the tube longitudinally forward at a constant speed and simultaneously manipulate said tube to progressively present the seam thereof in alinement with said welding flame, and means for regulating the pressure to be exerted at the seam to aid in the formation of the weld.

3. A tube machine comprising a continuous multiple member vise mechanism for receiving and propelling a non-circular tube and adapted to torsionally manipulate it to present the seam thereof in definite straight line position and including means for regulating the pressure of its vise members upon the tube.

4. A tube welding machine comprising a continuous vise adapted to receive the tubing and automatically coöperate with said tube to present the seam thereof in a straight line and relatively fixed welder adapted to progressively weld said seam as it is thus presented in said straight line.

5. A tube welding machine comprising a relatively stationary welding burner adapted to play a flame upon the seam of the tube, in combination with automatic traveling holder adapted to propel the tube forwardly at a constant speed and simultaneously exert a torsional force upon said tube to straighten and present the seam thereof in alinement with said burner.

6. A tube welding machine comprising a relatively stationary welding burner adapted to project a welding flame upon the seam of the tube, in combination with tube positioning and propelling vise adapted in clamping to twist said tube to expose the seam thereof directly in alined position to said flame.

7. In a tube welding machine a tube propelling and seam straightening vise, in combination with means for welding the seam of the tube as fast as it travels.

8. In a tube welding machine a tube propelling and seam straightening vise, and a relatively stationary welding burner adapted to play a welding flame upon the seam of the tube and progressively weld same as the tube travels.

9. A machine for welding non-circular tubes, comprising constant speed tube carrying vise adapted to clamp and torsionally manipulate the tube as it travels, and a welding burner arranged above and adapted to play a welding flame upon the seam of the tube and progressively weld same as the tube travels.

10. A machine for welding tubes of non-circular cross section comprising a moving mechanism for propelling the tube forwardly at constant speed, and formed for co-action with the tube to rotate the tube and position its seam in a predetermined line, and a welding burner positioned above said mechanism and adapted to project a welding flame upon the tube seam as it travels.

11. A machine for welding non-circular tubes comprising means for heating the tube, in combination with a traveling mechanism for receiving and propelling the tube at a substantially constant speed, and adapted to forcibly rotate said tube whereby to position its seam in alinement with said heating means.

12. A machine for welding non-circular tubes comprising means for heating the tube, in combination with a continuous tube-holding mechanism for receiving and propelling the tube at a substantially constant speed, said mechanism being formed to forcibly twist the tube whereby to position its seam in alinement with said heating means, and to hold the tube edges in butt relation and to cause pressure at the seam as the welding operation is being performed, and a pressure relieving device operable after the formation of the weld.

13. A machine for welding the seam of non-circular tubes, comprising a welding burner, in combination with a traveling vise adapted to progressively grip said tubing and propel it forwardly at a constant speed, said vise being formed to co-act with the non-circular exterior of said tube and exert a torsional force thereupon to straighten the seam and present it in proper alinement with said burner.

14. A welding machine comprising a continuous vise formed to automatically grip a non-circular tube, propel the tube forwardly at constant speed, correct the irregularities therein to position the seam for welding, in combination with a burner arranged above said vise and adapted to project a welding flame upon the positioned seam and progressively weld the seam as fast as the tube travels.

15. In a machine for welding non-circular tubes, a continuous vise consisting of a plurality of sections adapted to successively grip the incoming tube and forcibly rotate the same to straighten the seam thereof, and a relatively stationary burner located above said vise in position to impinge a welding flame upon and weld the straightened seam of the tube as it travels.

16. In a machine for welding non-circular tubes, a continuous vise consisting of a plurality of sections adapted to successively grip the incoming tube and forcibly rotate the same to straighten the seam thereof, a relatively stationary burner located above said vise in position to impinge a welding flame upon and weld the straightened seam of the tube as it travels, and means for causing said vise sections to exert desired pressure at the seam to aid in forming the weld.

17. The improvements herein described comprising a continuously traveling conveyer for propelling a non-circular tube forward at constant speed, in combination with a flame burner above said conveyer and adapted to project a welding flame upon and weld the seam of the tube as it travels, said traveling conveyer automatically clamping the successive portions of the tubing to hold the tube edges in welding relation and formed to co-act with the non-circular exterior of the tube to properly aline the seam with said welding flame.

18. In an automatic welding machine a continuous vise for constantly acting to grip successive portions of an incoming non-circular tube and automatically apply pressure thereto to close the edges of the tube seam together, in combination with a stationary burner above said tube carrier adapted to impinge a fine, narrow welding flame upon and weld the seam of the tube as it passes therebelow, said continuous vise having gripping surfaces formed to cause the tube by reason of its non-circularity to straighten its seam in proper alinement with said burner.

19. In an automatic welding machine a continuous vise for constantly acting to grip successive portions of an incoming non-circular tube and automatically apply pressure thereto to close the edges of the tube seam together, in combination with a stationary burner above said tube carrier adapted to impinge a fine, narrow welding flame upon and weld the seam of the tube as it passes therebelow, said vise having gripping surfaces formed to cause the tube by reason of its non-circularity to straighten its seam in proper alinement with said burner, and an automatic device for opening the said vise after the weld is formed.

20. In a machine for welding non-circular tubes a constantly moving tube holder comprising a plurality of laterally movable vise jaws adapted to successively grip a tube and propel it forwardly, and having gripping surfaces formed to co-act with the exterior of the particular shape of tube to be welded, and thereby rotatably actuate the tube as they grip it to present the seam in a pre-determined position, and a stationary localized welding burner adapted to weld the seam as the tube travels in said position.

21. A tube welding machine comprising a continuous multiple element mechanism formed to receive a non-circular tube and adapted to grip successive portions of the tube, and thereby to manipulate the tube torsionally and present the seam thereof in a predetermined position, in combination with a welding burner adapted to play a welding flame upon the positioned tube in the continuous mechanism and progressively weld the seam of the tube as fast as the tube travels.

22. A machine for welding non-circular tubes, comprising means for heating the tube, in combination with a multiple element traveling mechanism adapted to receive and propel a non-circular tube, the tube-receiving portion thereof formed in such manner that when the tube is grasped it is forcibly twisted, thereby positioning the seam of the tube in proper alinement with said heating means, the traveling mechanism automatically acting to cause a welding pressure at the tube seam as the welding operation is being performed.

23. In an automatic welding machine a continuous vise for constantly acting to grip successive portions of an incoming non-circular tube, the gripping portions of said vise formed with a curvature corresponding to predetermined portions of the non-circular tube, means for adjusting the pressure of the vise upon the tube, in combination with a stationary burner arranged above the vise and adapted as the tube passes to impinge a welding flame upon the seam thereof.

24. A tube welding machine comprising a welding burner arranged to play a welding flame upon the seam of the tube, in combination with mechanism automatically operative to propel a tube forward, said mechanism comprising a plurality of elements which successively grasp the tube and thereby manipulate it and progressively present the seam thereof in alinement with said welding flame.

In testimony whereof, I have hereunto set my hand, this 11th day of March, 1912, in the presence of two subscribing witnesses.

MARSHALL BURNS LLOYD

Witnesses:
HILDA C. PETERSON,
CHARLES GILBERT HAWLEY.